(12) United States Patent
Wingett et al.

(10) Patent No.: US 6,827,311 B2
(45) Date of Patent: Dec. 7, 2004

(54) FLIGHT CONTROL ACTUATION SYSTEM

(75) Inventors: Paul T. Wingett, Mesa, AZ (US); Louie T. Gaines, Phoenix, AZ (US); Paul S. Evans, Mesa, AZ (US); James I. Kern, Phoenix, AZ (US)

(73) Assignee: Honeywell International, Inc., Morristown, NJ (US)

( * ) Notice: Subject to any disclaimer, the term of this patent is extended or adjusted under 35 U.S.C. 154(b) by 43 days.

(21) Appl. No.: 10/410,413

(22) Filed: Apr. 7, 2003

(65) Prior Publication Data

US 2004/0195441 A1 Oct. 7, 2004

(51) Int. Cl.[7] .............................................. B64C 13/40
(52) U.S. Cl. ...................... 244/75 R; 244/227; 244/82
(58) Field of Search ............................. 244/75 R, 76 A, 244/78, 215, 227, 228, 82

(56) References Cited

U.S. PATENT DOCUMENTS

| | | | |
|---|---|---|---|
| 2,787,429 A | | 4/1957 | White |
| 3,761,041 A | * | 9/1973 | Putman ........................ 244/13 |
| 4,272,046 A | | 6/1981 | Irick |
| 4,793,576 A | * | 12/1988 | Frerk .......................... 244/228 |
| 5,074,495 A | | 12/1991 | Raymond |
| 5,186,416 A | * | 2/1993 | Fabre et al. ............... 244/75 R |
| 5,806,805 A | * | 9/1998 | Elbert et al. ................. 244/195 |
| 5,913,492 A | | 6/1999 | Durandeau et al. |
| 6,076,775 A | | 6/2000 | Bauer |
| 6,202,674 B1 | | 3/2001 | Wingett |
| 6,349,900 B1 | | 2/2002 | Uttley et al. |
| 6,377,906 B1 | | 4/2002 | Rowe |
| 6,704,624 B2 | * | 3/2004 | Ortega et al. ................... 701/3 |

* cited by examiner

Primary Examiner—Robert P. Swiatek
(74) Attorney, Agent, or Firm—Douglas A. Mullen, Esq.

(57) ABSTRACT

A flight control actuation system comprises a controller, electromechanical actuator and a pneumatic actuator. During normal operation, only the electromechanical actuator is needed to operate a flight control surface. When the electromechanical actuator load level exceeds 40 amps positive, the controller activates the pneumatic actuator to offset electromechanical actuator loads to assist the manipulation of flight control surfaces. The assistance from the pneumatic load assist actuator enables the use of an electromechanical actuator that is smaller in size and mass, requires less power, needs less cooling processes, achieves high output forces and adapts to electrical current variations. The flight control actuation system is adapted for aircraft, spacecraft, missiles, and other flight vehicles, especially flight vehicles that are large in size and travel at high velocities.

17 Claims, 9 Drawing Sheets

FLIGHT CONTROL ACTUATION SYSTEM

GOVERNMENT RIGHTS

The invention described herein was made in the performance of work under NASA Cooperative Agreement No. NCC8-115, dated Jul. 1, 1996, and is subject to the provisions of Section 305 of the National Aeronautics and Space Act of 1958(42 U.S.C. 2457). The Government has certain rights in this invention.

BACKGROUND OF THE INVENTION

This present invention relates generally to flight control actuation systems and, more specifically, to a method and apparatus for a dual actuator control system, containing at least one electromechanical actuator and at least one pneumatic actuator. The present invention concerns actuator systems for controlling flight control surfaces on aircraft, spacecraft, missiles, and other flight vehicles.

Actuator servomechanism systems are used to manipulate flight control surfaces to control flight direction, speed, inclination and other positional adjustments for flight vehicles. The actuator systems have used mechanical, hydraulic, electrical, piezoelectrical, and electromechanical systems to apply force to the control surfaces. For safety, redundant parallel systems are used to independently maintain control of the flight control surface in the event of failure of one of the actuator systems. One such parallel system is disclosed in U.S. Pat. No. 5,074,495 to Raymond. The hydraulically- and electrically-powered actuators individually are capable of providing full actuation power. This system design does not account for significant variances from the normal operational range of the electrically powered actuator, such as control surface flutter and shockwave conditions. Flutter is oscillatory motion between the vehicle frame and the control surface. Flutter increases as the vehicle approaches resonant frequencies. Shockwave conditions increase control surface loads as the vehicle approaches sonic velocity. To account for the resultant high control surface loads, the actuator systems must be large in size and mass, negatively impacting flight vehicle weight constraints and aerodynamic envelope limitations. Additionally, large flight vehicles traveling at high speeds introduce risks of overloading the electrical actuator from the greater forces needed to manipulate the flight control surfaces in such situations. To address these issues, power-assist systems were developed to amplify the force applied from the main control system and to minimize the control system resistance to movement. An example of such a system is disclosed in U.S. Pat. No. 6,349,900 to Uttley, et al. This actuator system uses an electrical actuator assisted by a control tab mounted on the control surface. This system's drawbacks are lower output forces than conventional actuator systems, and the excess size and mass added to the flight vehicle from the use of control tabs.

None of the prior art is specifically intended for lightweight, high-speed applications, and some suffer from one or more of the following disadvantages:

a) excessive mass and size.
b) inability to accommodate flutter or shockwave effects.
c) increased cooling requirements.
d) low achievable output forces.
e) inferior aerodynamic envelope conditions.
f) inability to use detected electrical actuator current variations.

As can be seen, there is a need for an improved apparatus and method for a light, small, amplified flight control actuation system, which reacts well to flight extremes, such as high speeds and resonant frequencies, does not require excessive cooling, provides high output forces and adapts to detected electrical actuator current variations.

SUMMARY OF THE INVENTION

In one aspect of the present invention, a flight control actuation system comprises a control means operable in response to an input for generating a control signal, an electromechanical actuator responsive to the control signal, for operating a flight control surface, and a pneumatic actuator for assisting the electromechanical actuator by reducing the load on the electromechanical actuator.

In another aspect of the present invention, a flight control actuation system comprises a control means operable in response to an input for generating a control signal, an electromechanical actuator responsive to the control signal, for operating a flight control surface, and a pneumatic actuator for assisting the electromechanical actuator by reducing the load on the electromechanical actuator, wherein the pneumatic actuator initializes when the current in the electromechanical actuator increases beyond a predetermined amperage.

In a further aspect of the present invention, a flight control actuation system for a flight vehicle comprises at least one flight control surface. An electromechanical actuator system is adapted to act on each flight control surface, and a pneumatic actuator system is adapted to produce a force to act on at least one of the flight control surfaces. At least one electromechanical actuator is associated with a distinct one of the at least one flight control surfaces and a controller adapted to produce an electrical signal for controlling at least one of the flight control surfaces. An electrical circuit is connected to the at least one electromechanical actuator which is adapted to receive the electrical signal, to control the position of the electromechanical actuator with the electromechanical actuator adapted to move in response to the electrical signal. The pneumatic actuator system is solely associated with the at least one electromechanical actuator, the pneumatic actuator system comprising a piston, a pressure vessel, an exhaust valve, a pressurization solenoid valve, a check valve, a manifold, a pressure switch, the valves adapted to receive the electrical signal and to route a pneumatic pressure to an actuation device adapted to receive the pneumatic pressure and produce a pneumatic force to continuously actuate the distinct one of the aerodynamic flight control surfaces of the flight vehicle in response to the electrical signal.

In another aspect of the present invention, a method is also disclosed for operating a flight control actuation system, the system being adapted to activate at least one pneumatic actuator in response to at least one signal produced by a control surface actuation signal system for positioning at least one control surface. The method comprises the steps of (a) receiving an input signal in the form of a position demand providing an instruction for deflecting a control surface to a new position and (b) the controller generating a corresponding control signal for operating an electromechanical actuator. In addition the method comprises the steps of (c) receiving a feedback signal in the form of an electrical current measurement at the electromechanical actuator, (d) comparing the electrical current measurement to a predetermined electrical current value, and (e) the controller generating a corresponding pressurization control signal for operating a pneumatic actuator for reducing the load on the electromechanical actuator.

In yet another aspect of the present invention, a method for operating a flight control actuation system comprises the steps of (a) operating a flight vehicle, (b) receiving a flap demand instruction, and (c) comparing the position demand with output from a control surface position sensor. In addition the method comprises the steps of (d) generating an actuator position demand to at least one electromechanical actuator, (e) monitoring the electromechanical actuator electrical current load, comparing the electrical current load with a predetermined electrical current load limit, (f) closing at least one exhaust valve, (g) opening at least one pressurization solenoid valve whenever the electromechanical actuator current is more than the predetermined electrical current load limit, and (g) closing a pressurization solenoid valve whenever the electromechanical actuator electrical current load decreases below the predetermined electrical current load limit.

These and other aspects, objects, features and advantages of the present invention, are specifically set forth in, or will become apparent from, the following detailed description of a preferred embodiment of the invention when read in conjunction with the accompanying drawings.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention may comprise a position controlled actuation system to accurately position a control surface while using an auxiliary actuation system to provide a load trim function for the position controlled actuation system. The present invention may allow the use of an auxiliary actuator to provide a large portion of the force to control the actuation system position. This may limit the smaller portion of the load, provided by a positioning actuator, to a level that is within the capability of a relatively low power positioning actuator.

Figure 1:
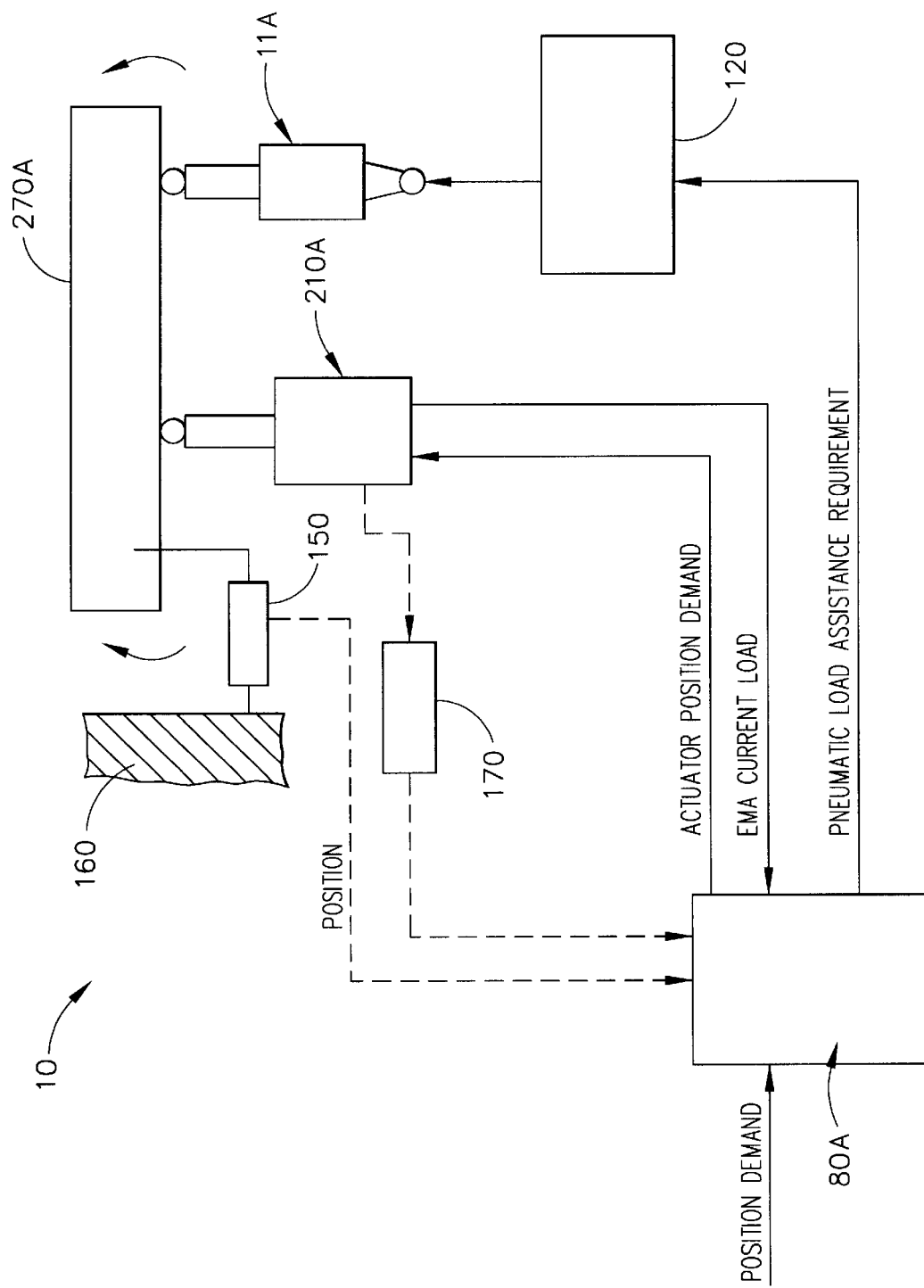
FIG. 1 is a schematic of the controller-driven actuation system acting on a flight control surface according to an embodiment of the present invention.
Figure 3:
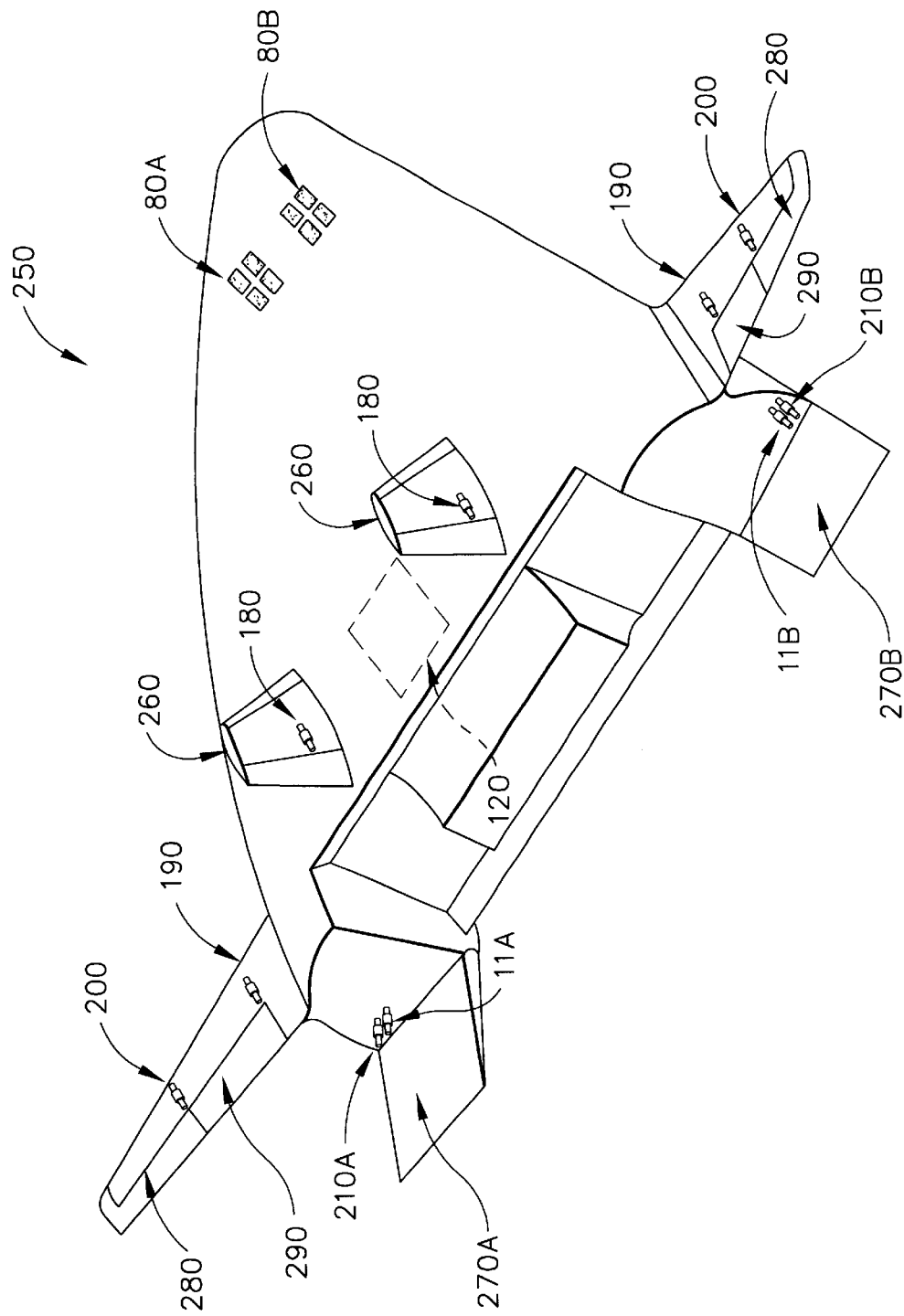
FIG. 3 is a perspective view of an X-33 flight vehicle with a flight control actuation system according to an embodiment of the present invention.

The invention is useful for controlling all types of flight vehicles, including, but not limited to, aircraft, missiles (including missile thrust vector controls), and spacecraft. One example of a use in spacecraft is depicted in FIG. 3. The X-33 flight vehicle 250 is a one-half-scale suborbital prototype for a proposed single-stage-to-orbit reusable launch vehicle. In flight tests, the X-33 flight vehicle 250 will accelerate to a maximum speed of Mach 16 and climb to an altitude of about 250,000 feet. The X-33 flight vehicle 250 may have four types of flight control surfaces: rudders 260, X-33 flight vehicle body flaps 270A and 270B, outboard elevons 280, and inboard elevons 290. Each of the flight control surfaces can be independently actuated with at least one electromechanical actuator (FIG. 1, 210A). For example, as shown in FIG. 3, a rudder actuator 180 may be situated to operate on rudder 260. Likewise a left outboard elevon actuator 200 may operate on the left outboard elevon 280 and the left inboard elevon actuator 190 may operate on the left inboard elevon 290. Left body flap pneumatic actuator 11A and right body flap pneumatic actuator 11B may supplement the X-33 body flap electromechanical actuator 210A and 210B forces to assist X-33 flight vehicle body flap 270A and 270B actuation, as shown in FIG. 3. A pneumatic actuator may be used to assist actuation of any of the flight control surfaces available. For illustrative purposes, the following description is of an aircraft, however, it is to be understood that other flight vehicles can be substituted for the aircraft.

The present invention generally provides a flight control actuation system (FIG. 1, 10) that may include an electromechanical subsystem that can independently control a flight control surface. The electromechanical subsystem may be associated with a pneumatic subsystem that may assist in controlling the flight control surface when needed. When the electrical current on the electromechanical actuator 210A surpasses a predetermined limit, the pneumatic system may activate under the direction of a controller. This is unlike the prior art, which relies on redundant actuation systems of large mass and size, which are vulnerable to flutter and shockwave phenomena, require heavy cooling systems, are unable to respond to electrical current load variations, produce low output forces, negatively impact aerodynamic envelope conditions, and fail to adjust to electromechanical overload conditions.

Referring to FIG. 1, there is shown a flight control actuation system 10, according to the present invention, for manipulating an aircraft flight control surface, such as an aileron, a wing or body flap, a slat, a flaperon, an elevator, a spoiler, or a rudder. In the present example, the flight control surface is a body flap. The following discussion applies equally to the left body flap (FIG. 3, 270A) and right body flap (FIG. 3, 270B).

The flight control actuation system 10 comprises a left body flap controller 80A, which may be installed on a flight vehicle, as shown in FIG. 3. The left body flap controller 80A may be located within the aircraft frame. The left body flap controller 80A may be connected to an electromechanical actuator 210A, which may be mounted in a position to exert a force on the left body flap 270A. The flight control actuation system 10 may operate as a servomechanism, where left body flap controller 80A may be situated to receive an input signal in the form of a position demand that may provide an instruction for manipulating the left body flap 270A. The left body flap controller 80A may generate a corresponding actuator position demand, as shown in FIG. 1, for operating the electromechanical actuator 210A, in response to the position demand. The left body flap controller 80A may be arranged to receive feedback signals that indicate movement of the left body flap 270A for generating control signals. Particularly, a control surface position sensor 150 mounted between the aircraft body 160 and the left body flap 270A may be arranged to send electrical signals to the left body flap controller 80A, which may indicate the left body flap 270A position in relation to the original closed position of left body flap 270A and the body flap acceleration. Alternatively, an electromechanical actuator position sensor 170 may be mounted externally or internally to the electromechanical actuator, and may be arranged to send an electrical signal representing the left body flap 270A position and/or the linear stroke position of the electromechanical actuator 210A to the left body flap controller 80A. The control surface position sensor 150 and the electromechanical actuator position sensor 170 may be rotary or linear variable differential transformers, potentiometers, Hall effect devices, or other generally known suitable devices.

The left body flap controller 80A may be arranged to receive an input signal in the form of a position demand providing an instruction for deflecting the left body flap 270A to a new position. The position demand may be generated by a pilot, a computer, or a remote control device. Upon receipt of the position demand, the left body flap controller 80A may monitor the position and acceleration signals from the control surface position sensor 150 and/or the electromechanical actuator position sensor 170 and may generate an actuator position demand signal representing a new stroke position for the electromechanical actuator 210A. The response of the electromechanical actuator 210A may be to adjust the position of the left body flap 270A by extending or retracting the shaft to exert a force on the left body flap 270A to move the body flap in the commanded direction. The left body flap 270A then may move to a new position.

Figure 5:
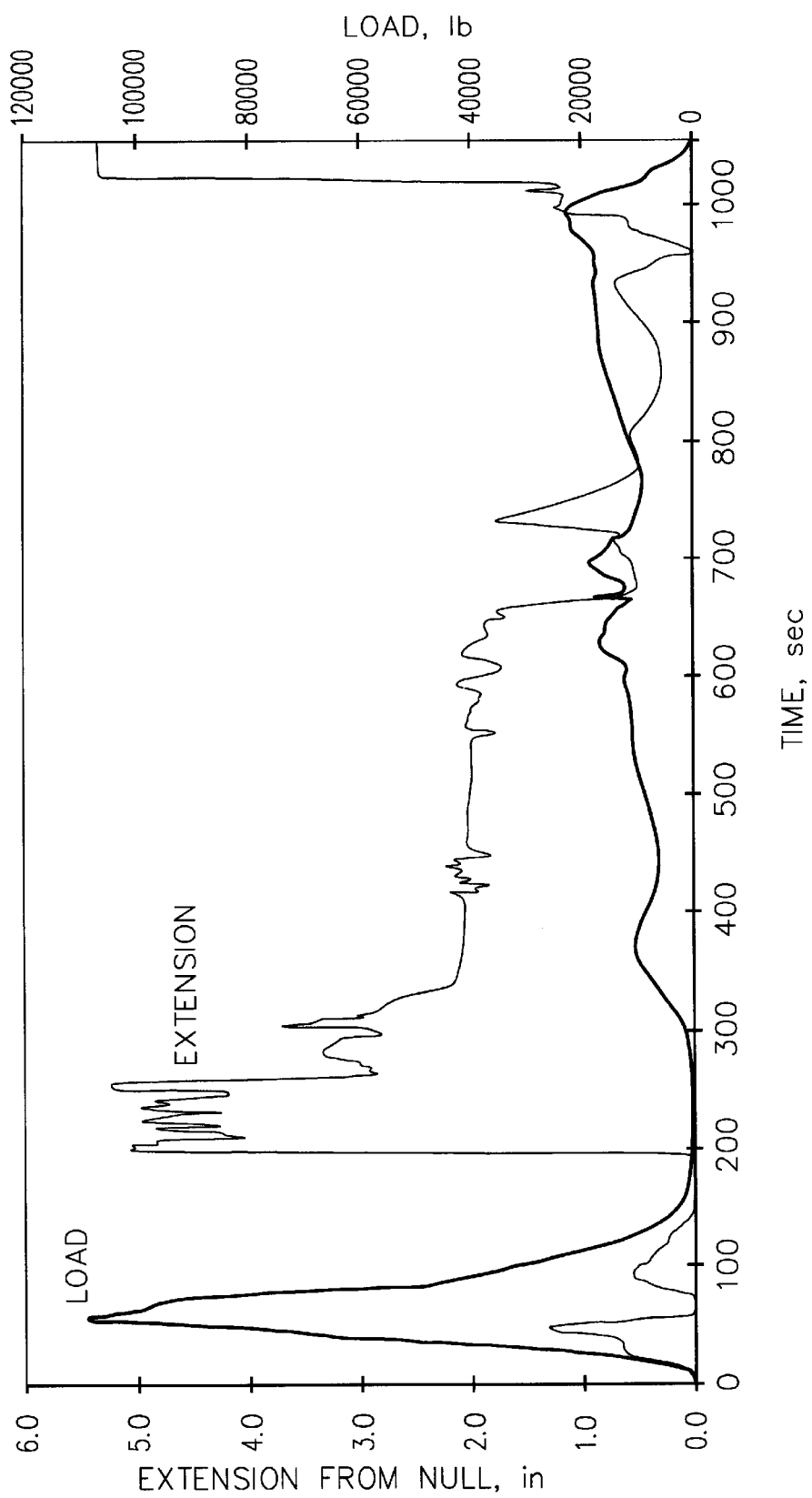
FIG. 5 is a graph of body flap load and body flap extension length versus time, according to an embodiment of the present invention.
Figure 6:
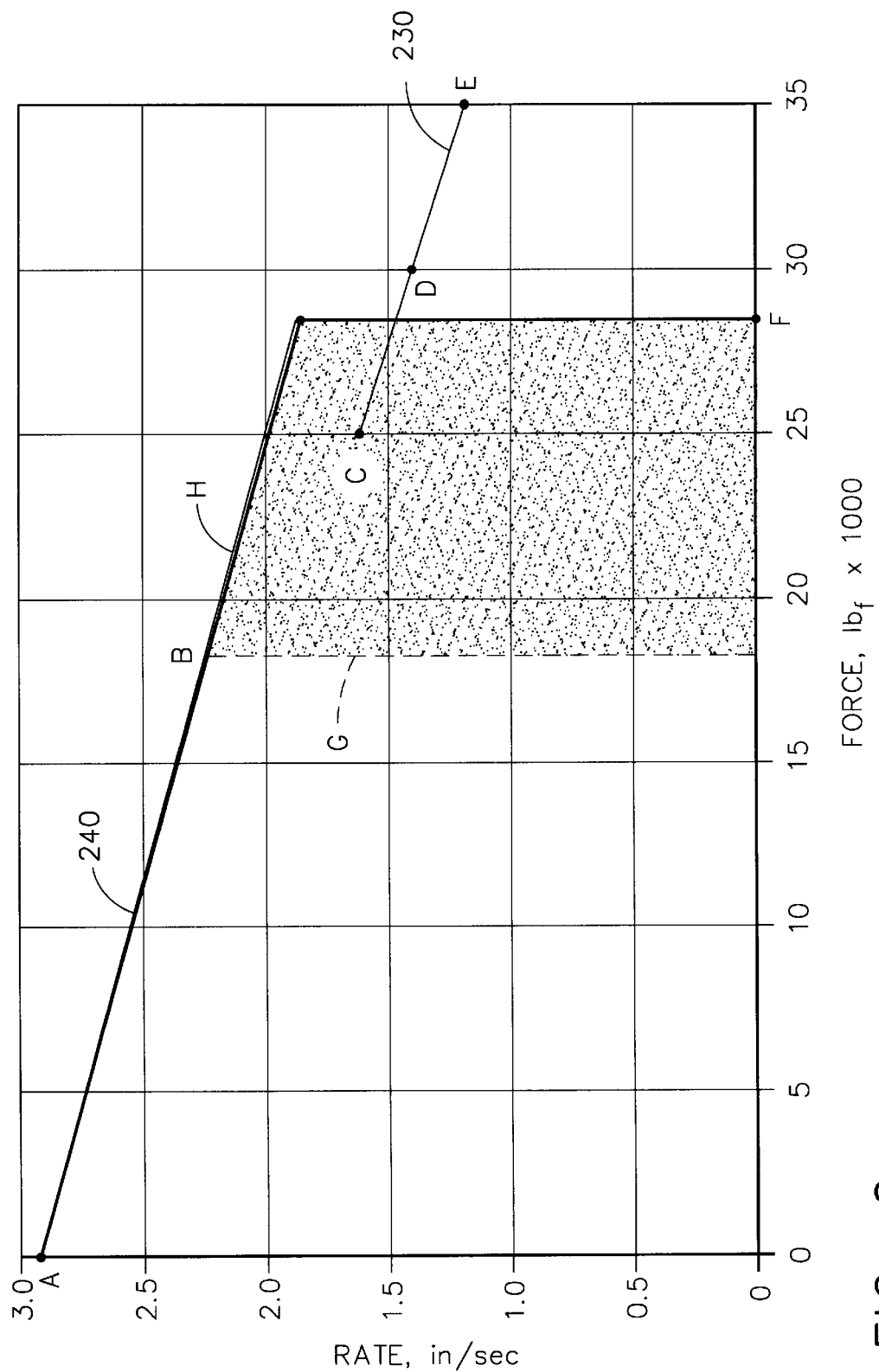
FIG. 6 is a graph of actuator rate versus actuator force, comparing the power demands of a sole electromechanical actuator and the system of the present invention using an electromechanical actuator and a pneumatic actuator, according to an embodiment of the present invention.

The behavior of the present invention can be further understood by reference to the graph in FIG. 5, which describes the relationship between body flap load and body flap extension length versus time. As the load on the electromechanical actuator 210A increases, the left body flap controller 80A may activate the pneumatic system to cause the left body flap pneumatic actuator 11A to act on the left body flap 270A to assist the electromechanical actuator 210A in absorbing the load on left body flap 270A. In this example, as the left body flap pneumatic actuator 11A initiates, the load on the electromechanical actuator 210A may fall to values substantially below 18,000 pounds. The load on the electromechanical actuator 210A may peak at approximately 100,000 pounds of force, without assistance from the left body flap pneumatic actuator 11A, which may activate during the first 100 seconds of operation. FIG. 6 demonstrates the difference between the force requirements when using only the electromechanical actuator 210A and using the present invention, comprising the use of the combination of the electromechanical actuator 210A and left body flap pneumatic actuator 11A to assist during increased flap load conditions. The motor capability plot 240 may indicate the capability of the electrical motor (not shown) that operates the electromechanical actuator 210A. When the force is zero, the maximum no-load rate point A may correspond to the maximum attainable speed of the electrical motor. Point F represents the maximum stall load (at zero rate), which must be resisted to hold the flight control surface in its desired position and prevent the surface from returning back to a neutral position (position before extending the surface). Point B may be the maximum force condition that combines a load that may be substantially less than the maximum stall load F with high motor rate.

Under normal flight conditions, when the body flap load may be low, for example, under 18,000 pounds force and 40 amps, the left body flap pneumatic actuator 11A, attached to the left body flap 270A, may not be in use. The body flap performance plot 230 indicates the range of power needed to operate a left body flap 270A. The ideal power condition (when using only the electromechanical actuator 210A) may be at the body flap specification point C. E, the body flap performance limit point, may be the extreme condition of the body flap performance limit point, while the intermediate point may be the location of the body flap performance mid-point D. Using only the electromechanical actuator 210A may not be optimal, as the majority of the body flap performance, as represented by the length of the body flap performance plot 230, occurs outside the capability of the motor, as represented by the motor capability plot 240. However, when the left body flap pneumatic actuator 11A combines with the electromechanical actuator 210A, the electrical motor operates at the dotted line G extending vertically down from the maximum force condition B. The amount of force at this point, 18,000 pounds may be the maximum electromechanical actuator force requirement to extend the left body flap 270A, using the present invention. The shaded portion H indicates the added capability on the left body flap 270A with the electromechanical actuator 210A and the left body flap pneumatic actuator 11A in combination.

Figure 7A:
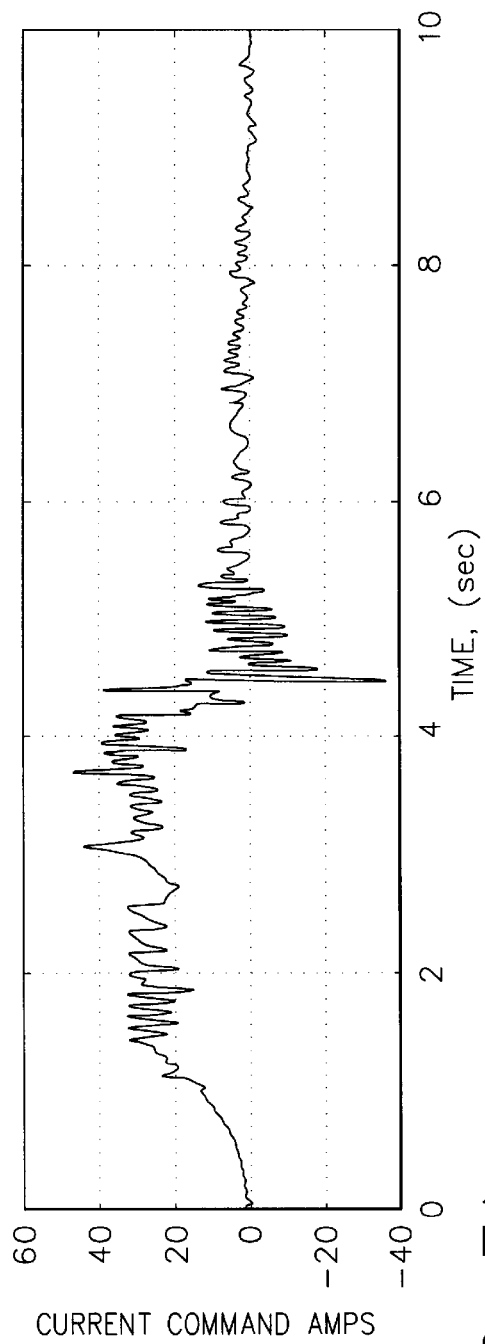
FIG. 7A is a graph of a measurement of electromechanical actuator electric current versus time, according to an embodiment of the present invention.
Figure 7B:
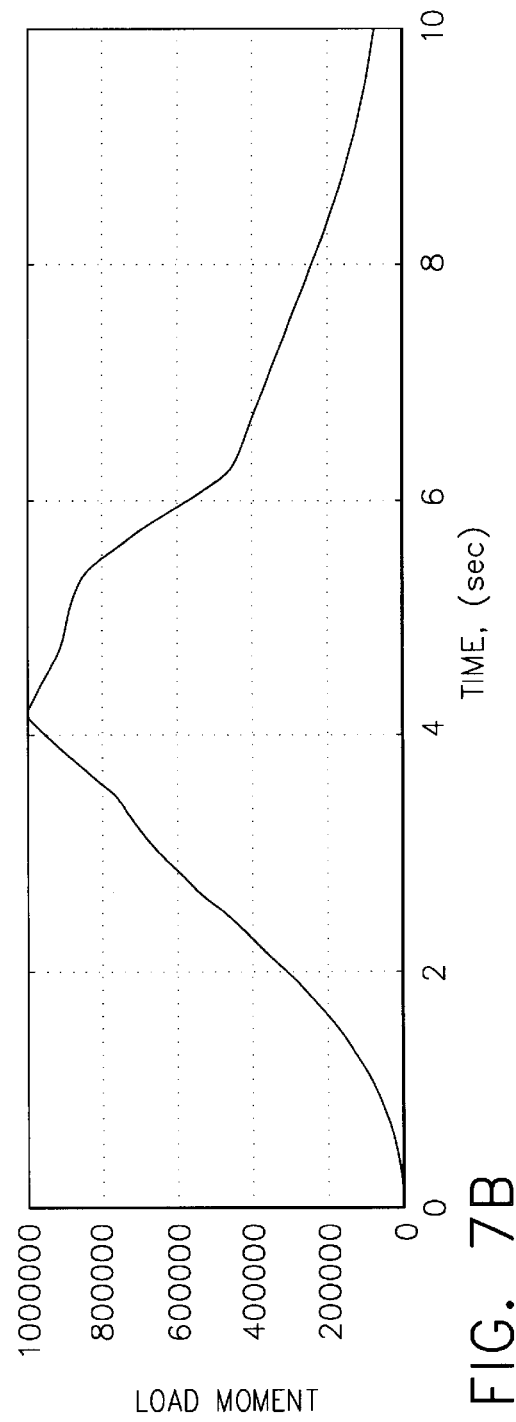
FIG. 7B is a graph of body flap load moment versus time, according to an embodiment of the present invention.
Figure 7C:
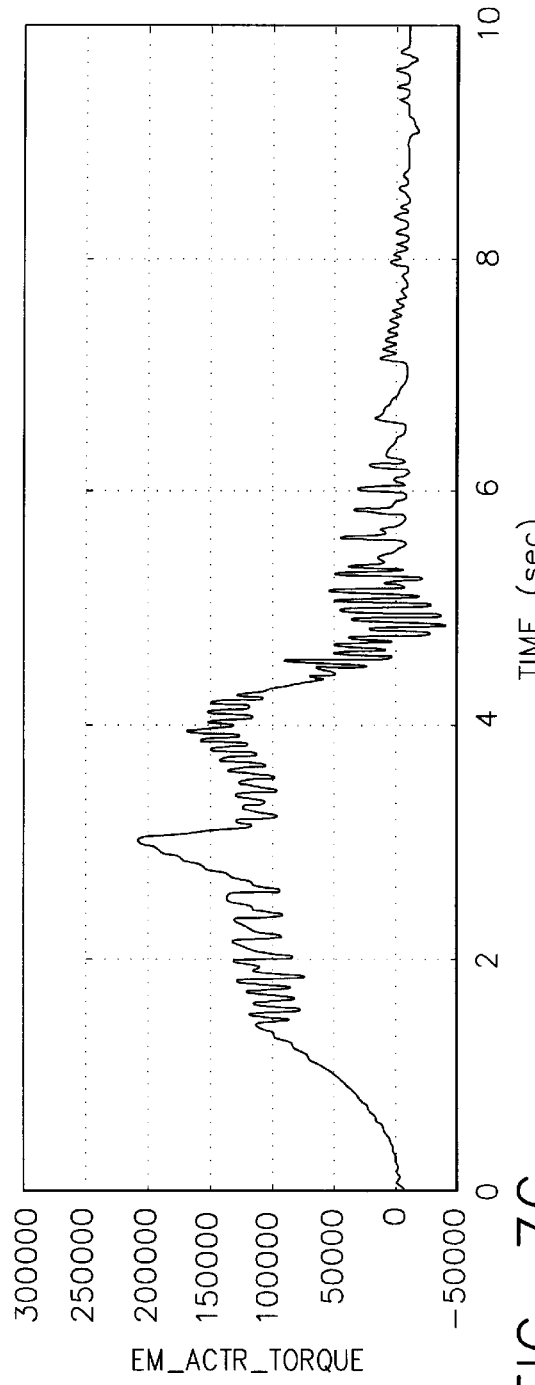
FIG. 7C is a graph of electromechanical actuator torque versus time, according to an embodiment of the present invention.
Figure 7D:
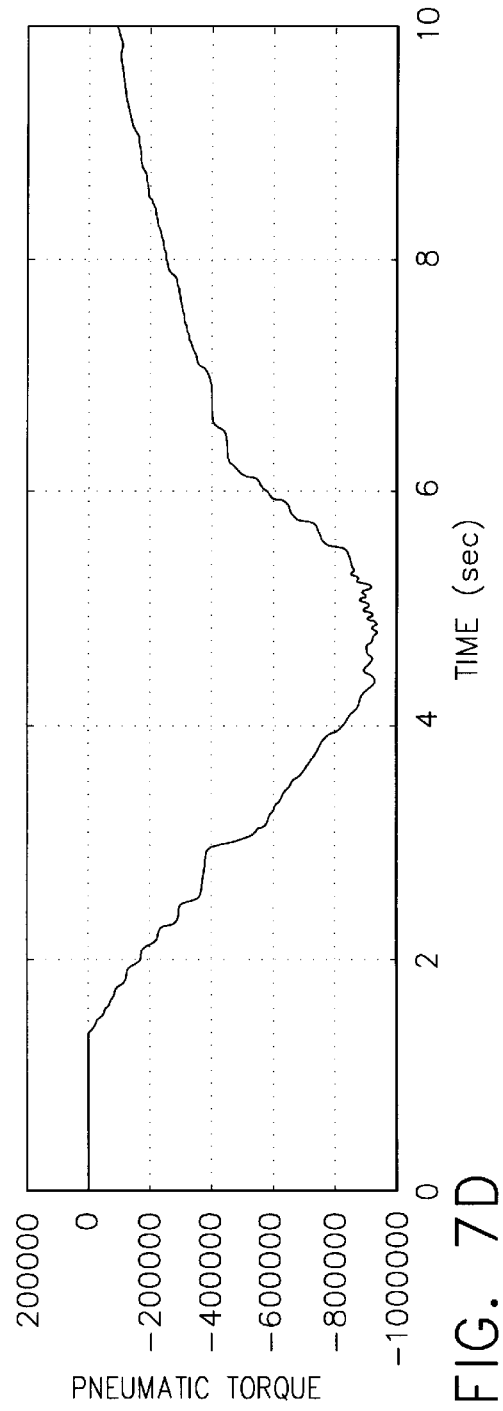
FIG. 7D is a graph of pneumatic actuator torque versus time, according to an embodiment of the present invention.

FIGS. 7A, 7B, 7C, and 7D depict the electrical current behavior in relation to the load, and actuator torques. In FIG. 7A, the electrical current initially increases to about 40 amps, then drops to negative values (up to about −30 amps), then level out to values of about 0 amps. FIG. 7B shows how the load increases substantially steadily until about the point where the electrical current changes from positive amperage to negative amperage. The load decreases substantially afterwards. In FIG. 7C, the torque on the electromechanical actuator 210A exhibits behavior analogous to the behavior of the electrical current (initially increasing, substantially decreasing, then settling to substantially zero). In FIG. 7D, the pneumatic torque may initially be at zero, indicating that the left body flap pneumatic actuator 11A may not yet be activated. When the electrical current, as shown in FIG. 7A, reaches about 40 amps, then the left body flap controller 80A sends a pneumatic load assistance requirement, as shown in FIG. 1. As the left body flap pneumatic actuator 11A activates, the pneumatic torque increases in a negative direction, as shown in FIG. 7D, along with the increasing load shown in FIG. 7B. As the pneumatic torque reaches a peak value (FIG. 7D), the electromechanical torque decreases (FIG. 7C), the electrical current markedly decreases (FIG. 7A) and the load peaks before diminishing. As can be seen by the FIGS. 7A–7D, the combination of the left body flap pneumatic actuator 11A with the electromechanical actuator 210A enables effective control of the left body flap 270A while limiting the maximum load on the electromagnetic actuator 210A with increasing left body flap 270A loads. The controller activates left body flap pneumatic actuator 11A when the electromechanical actuator 210A electrical current exceeds 40 amps, to assist the manipulation of left body flap 270A by the electromechanical actuator 210A.

In extreme flight conditions, for example high-speed flight or large aircraft mass or size, the force needed to adjust the left body flap 270A position may be substantial, requiring substantial electric current to the electromechanical actuator 210A. This normally would require an electromechanical actuator 210A of substantial size and mass. However, using an electromechanical actuator 210A that may be too large would affect negatively the aerodynamic envelope. Furthermore, a massive device would negatively affect the maximum flight weight limit and the maneuverability of a flight vehicle. Instead, the present invention comprises a controller that may be adapted to use a more compact, lighter electromechanical actuator 210A. When the electrical current load on the electromechanical actuator 210A increases past a predetermined maximum limit, based on the capability of the electromechanical actuator 210A, the left body flap controller 80A may produce a signal to pressurize the left body flap pneumatic actuator 11A, to apply force to the left body flap 270A by reducing the load on electromechanical actuator 210A and to assist in manipulating the position of the left body flap 270A.

Figure 4:
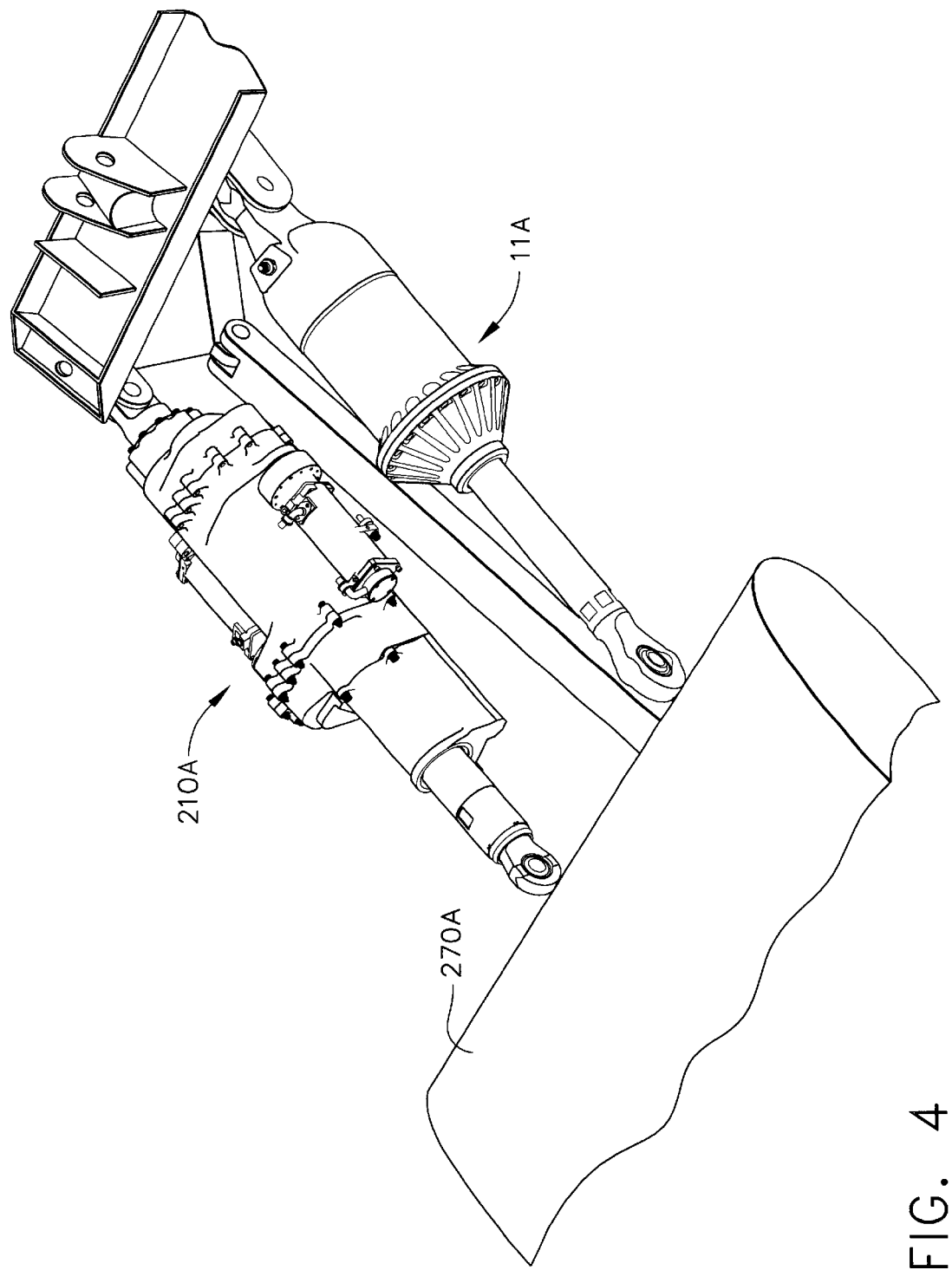
FIG. 4 is a perspective view of an electromechanical actuator and a pneumatic actuator, both actuators acting on the same flight control surface, according to an embodiment of the present invention.

FIG. 4 shows in more detail the electromechanical actuator 210A and the left body flap pneumatic actuator 11A acting on left body flap 270A. The electromechanical actuator 210A may be operated by an electrical motor (not shown), while the pneumatic supply module (FIG. 2, 120) constitutes a separate pneumatic system that powers the left body flap pneumatic actuator 11A. Using only the electromechanical actuator 210A to manipulate the left body flap 270A would not be sufficient under conditions where the left body flap 270A loads cause the electromechanical actuator 210A current to exceed 40 amps. The combined effect of the force applied by the combination of the electromechanical actuator 210A and the left body flap pneumatic actuator 11A may act together to produce sufficient force to manipulate the left body flap 270A even in high-speed aircraft, missiles, or other high demand flight vehicles. The use of the left body flap pneumatic actuator 11A may enable the use of an electromechanical actuator 210A of low output, with low power requirements, low mass and small size.

Figure 2:
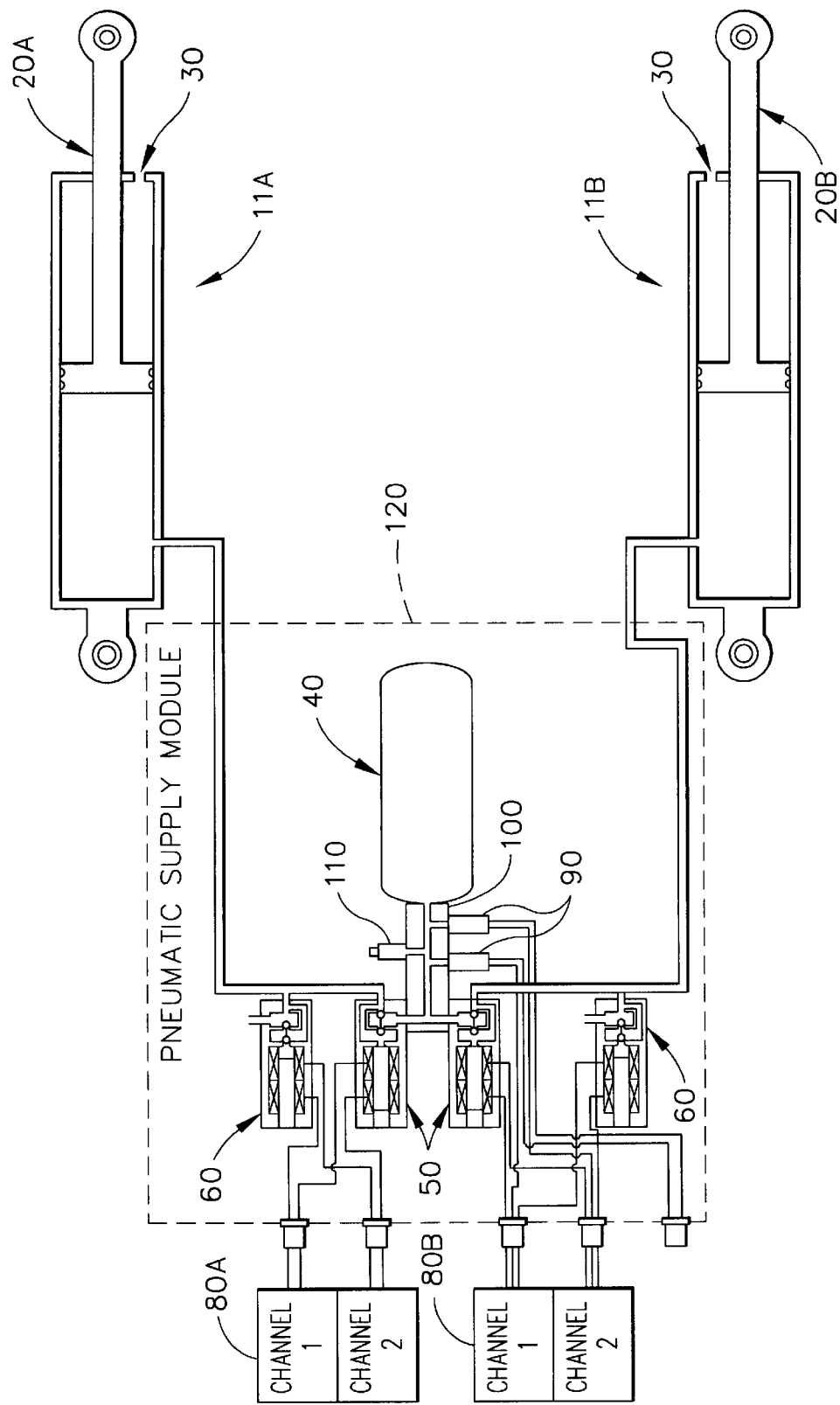
FIG. 2 is a schematic of a pneumatic actuation system according to an embodiment of the present invention.

Referring now to FIG. 2, a schematic view of the pneumatic portion of the flight control actuation system 10 is shown. The pneumatic portion of the flight control actuation system 10, which is further addressed below, may comprise one or more left body flap pneumatic actuators 11A, one or more left body flap controllers 80A, and one or more pneumatic supply modules 120. As explained above, the left body flap controller 80A may direct the operation of the left body flap pneumatic actuator 11A to assist an electromechanical actuator 210A in the manipulation of the left body flap 270A. The left body flap pneumatic actuator 11A may contain a left pneumatic actuator piston 20A and an actuator vent 30. The gas to provide the pneumatic force for the left body flap pneumatic actuator 11A may be provided by the pneumatic supply module 120 through the use of a pressure vessel 40 that stores high pressure gas, for example, nitrogen. A manifold 100 may be coupled to the mouth of the pressure vessel 40 for directing the flow of pressurized gas from the pressure vessel 40 to pressurization solenoid valves 50 which control the gas feed to the left and right body flap pneumatic actuators 11A, 11B. Vent solenoid valves 60 control the venting of gas from the left and right body flap pneumatic actuators 11A, 11B. At least one pressure switch 90 and at least one check valve 110 may aid in servicing the pressure vessel 40.

Figure 8:
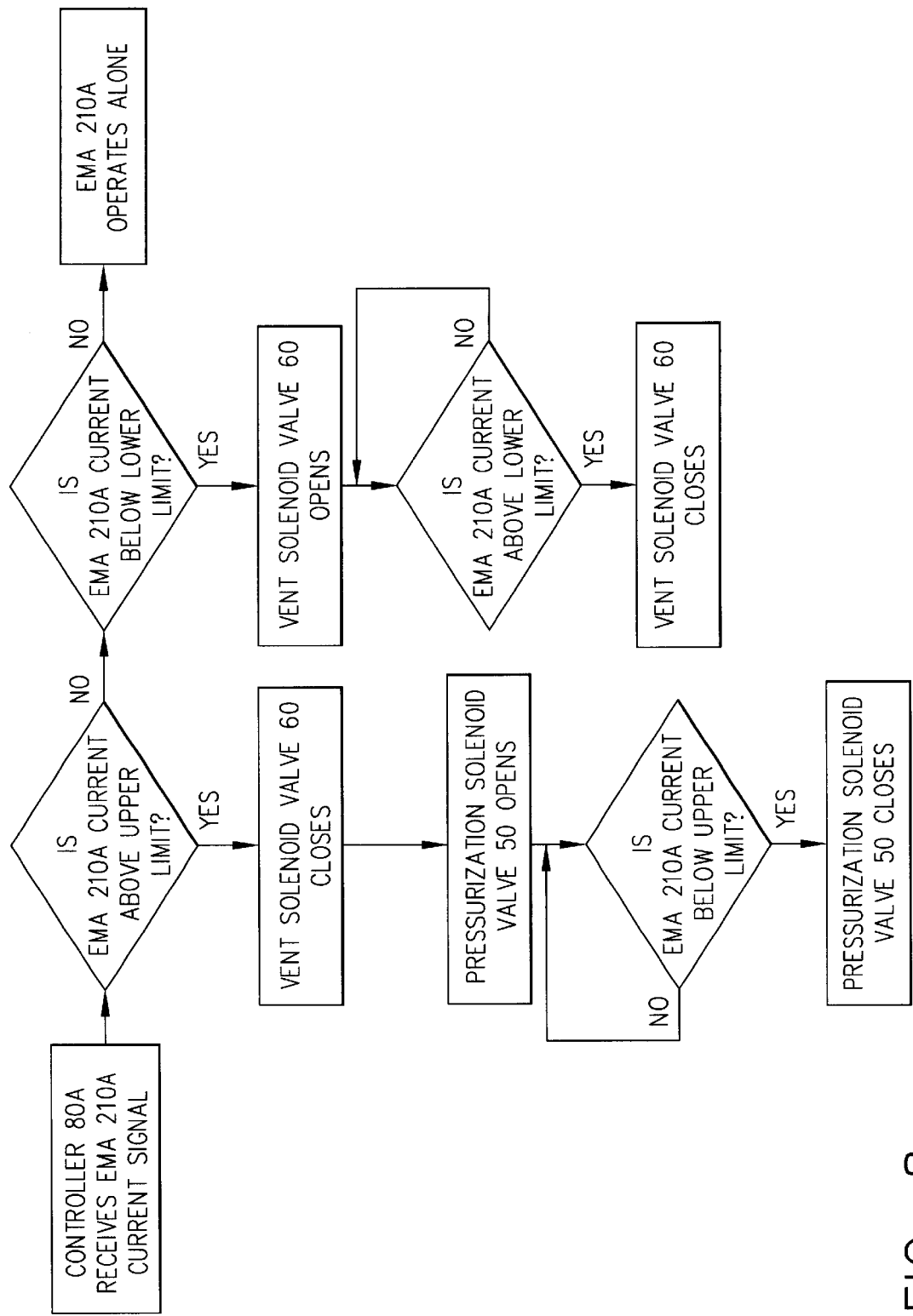
FIG. 8 is a flowchart demonstrating the function and operation of the pneumatic supply module, according to an embodiment of the present invention.

A logic flow diagram in FIG. 8 further displays the function and operation of the pneumatic supply module 120. Left body flap controller 80A may be connected by wires to the electromechanical actuator 210A to determine the actuator's electric current. Positive amperage may indicate a compressive condition in the electromechanical actuator 210A while negative amperage may indicate tension in the electromechanical actuator 210A. If the electric current does not exceed the electrical current load upper limit, for example, +40 amps, as shown in FIG. 7A, then electromechanical actuator 210A continues to operate without assistance from the left body flap pneumatic actuator 11A. If the electrical current does exceed +40 amps, then the vent solenoid valve 60 may close and the pressurization solenoid valve 50 may open. When the electrical current falls below +40 amps, the pressurization solenoid valve 50 may close. If the electric current falls below the lower limit, for example, zero amps, the vent solenoid valve 60 may open. When the electrical current rises above the lower limit, the vent solenoid valve 60 may close. The process shown in FIG. 8 may repeat as necessary to maintain the electromechanical current between the upper and lower current limits.

The pneumatic supply module 120 may comprise separate pressurization solenoid valves 50 and vent solenoid valves 60 to control pressure to the left and right body flap pneumatic actuators (11A and 11B, respectively), supplied by at least one pressure vessel 40. The pressurization solenoid valve 50 may act as the closure valve to the pressure vessel 40, being spring-loaded closed so as to not provide force to the left body flap pneumatic actuator 11A or the right body flap pneumatic actuator 11B when the system does not need assistance from the left or right body flap pneumatic actuators 11A, 11B.

Although the present invention has been described in considerable detail with reference to certain preferred versions thereof, other versions are possible. Therefore, the spirit and scope of the appended claims should not be limited to the description of the preferred versions contained therein.

We claim:

1. A flight control actuation system for use in a flight control system comprising:
    a controller operable in response to an input for generating a control signal;
    an electromechanical actuator responsive to the control signal, for operating a flight control surface;
    a pneumatic actuator for assisting the electromechanical actuator by reducing the load on the electromechanical actuator;
    wherein the pneumatic actuator initializes when the electrical current in the electromechanical actuator exceeds a predetermined amperage.

2. The flight control actuation system of claim 1, comprising at least one vent solenoid valve and at least one pressurization solenoid valve connected to the pneumatic actuator.

3. The flight control actuation system of claim 2, wherein the controller closes the pressurization solenoid valve when the electrical current decreases below the predetermined amperage.

4. The flight control actuation system of claim 2, wherein the predetermined amperage in the electromechanical actuator is 40 amps positive.

5. The flight control actuation system of claim 2, wherein the controller opens the vent solenoid valve when the electrical current decreases below 10 amps negative.

6. The flight control actuation system of 1, wherein the predetermined amperage in the electromechanical actuator is 40 amps positive.

7. A method for operating a flight control actuation system, the system being adapted to activate at least one pneumatic load assist actuator in response to at least one signal produced by a control surface actuation signal system for positioning at least one control surface, the method comprising the steps of:

receiving an input signal in the form of a position demand providing an instruction for deflecting a control surface to a new position;

generating a corresponding control signal for operating an electromechanical actuator;

receiving a feedback signal in the form of an electrical current measurement at the electromechanical actuator;

comparing the electrical current measurement to a predetermined electrical current value; and, generating a corresponding control signal for operating a pneumatic actuator for reducing the load on the electromechanical actuator.

8. The method of claim 7, comprising a further step wherein the pneumatic actuator vents and relieves force when the electromechanical actuator tension load increases.

9. The method of claim 7, wherein the electromechanical actuator and the pneumatic actuator are attached to the same flight control surface.

10. A method for operating a flight control actuation system comprising the steps of:

operating a flight vehicle;

receiving a flight control surface position demand instruction;

comparing the position demand with output from a control surface position sensor;

generating an actuator position demand to at least one electromechanical actuator;

monitoring the electromechanical actuator electrical current load;

comparing the electrical current load with a predetermined electrical current load limit;

closing at least one vent solenoid valve;

opening at least one pressurization solenoid valve whenever the electromechanical actuator current is more than the predetermined electrical current load limit; and closing a pressurization solenoid valve whenever the electromechanical actuator electrical current load decreases below the predetermined electrical current load limit.

11. The method of claim 10, further comprising the step of:

opening at least one vent solenoid valve whenever the electromechanical actuator current is negative.

12. The method of claim 10, further comprising the step of:

closing at least one exhaust valve whenever the electromechanical actuator current is positive.

13. The method of claim 10, further comprising the step of:

opening at least one exhaust valve and closing at least one pressurization solenoid valve during a failure condition.

14. The method of claim 10, further comprising the step of generating a pneumatic load assistance requirement instruction to at least one pneumatic load assistance device, for manipulating a flight vehicle control surface.

15. The method of claim 10, wherein the flight vehicle is an aircraft.

16. The method of claim 10, wherein the flight vehicle is a spacecraft.

17. The method of claim 10, wherein the flight vehicle is a missile.

* * * * *